July 10, 1934.  J. M. JENKINS ET AL  1,966,173
TREATMENT OF GAS AND APPARATUS THEREFOR
Filed May 8, 1931  4 Sheets-Sheet 4
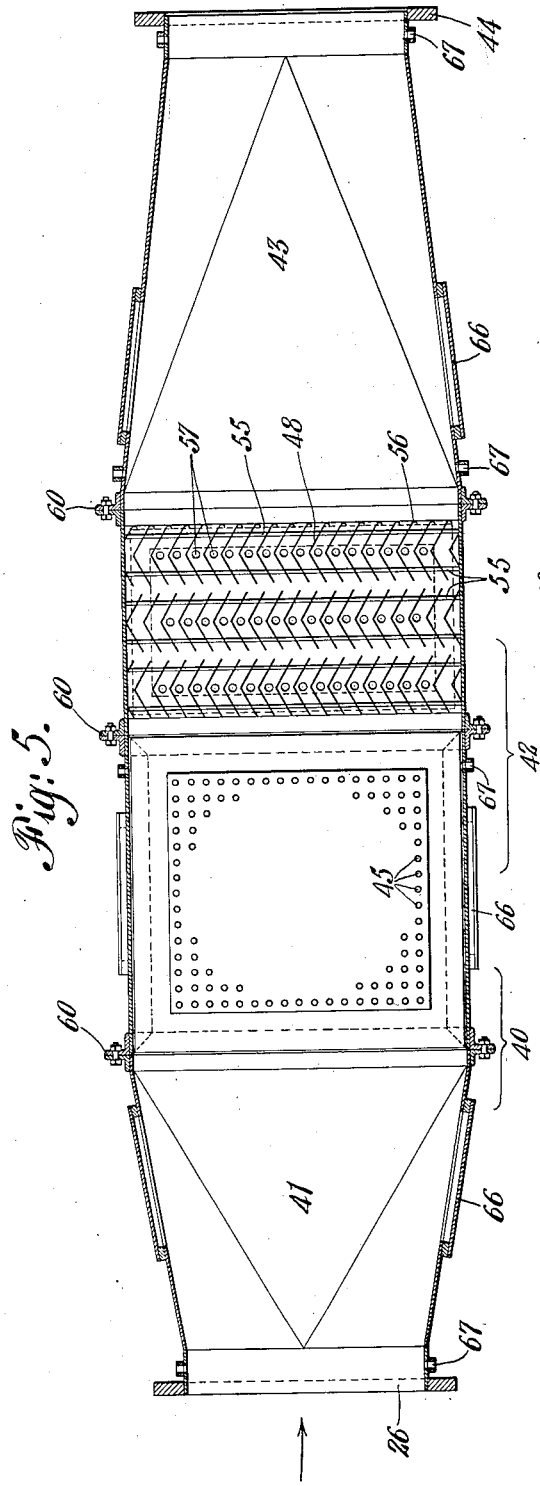
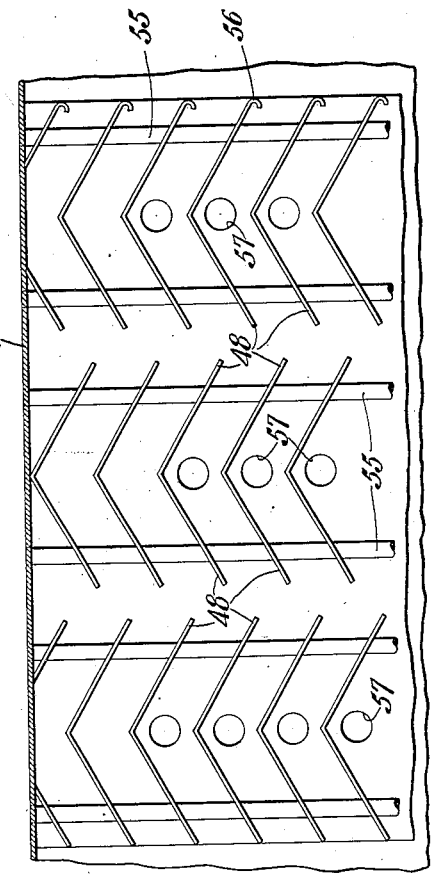
INVENTORS
JAMES M. JENKINS
RICHARD C. THOMPSON
D. RAYMOND McNEAL
BY
ATTORNEYS Patented July 10, 1934

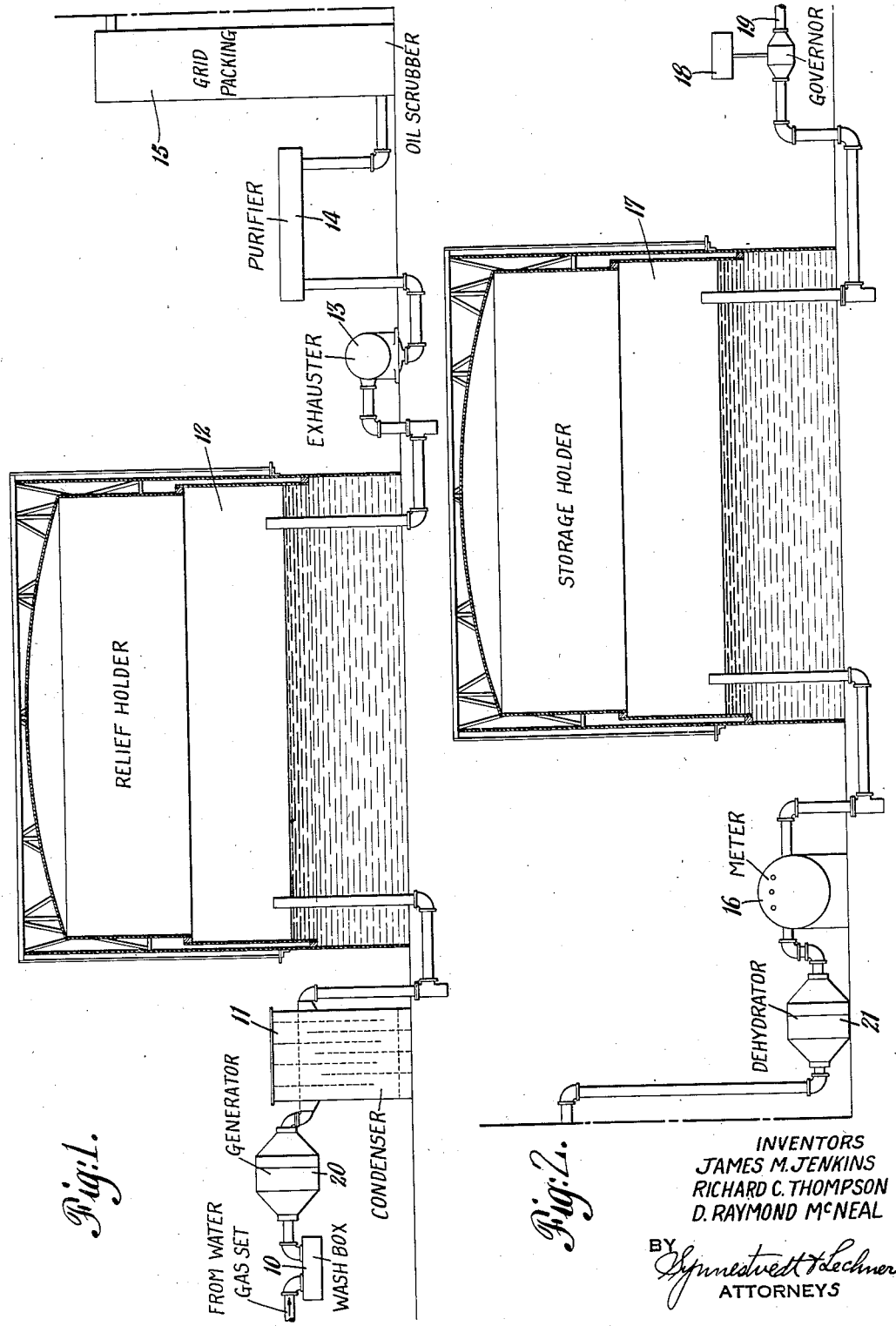

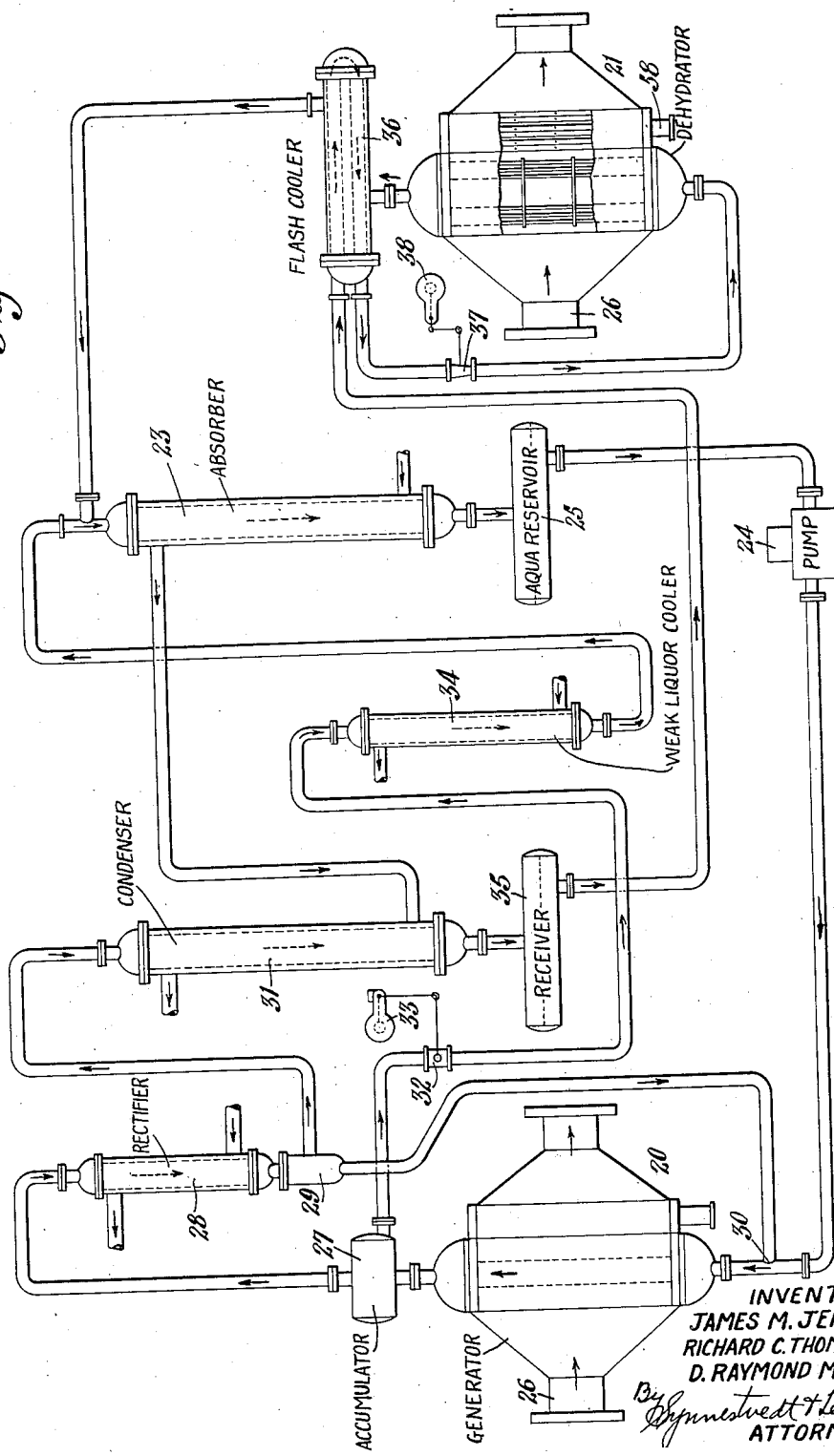

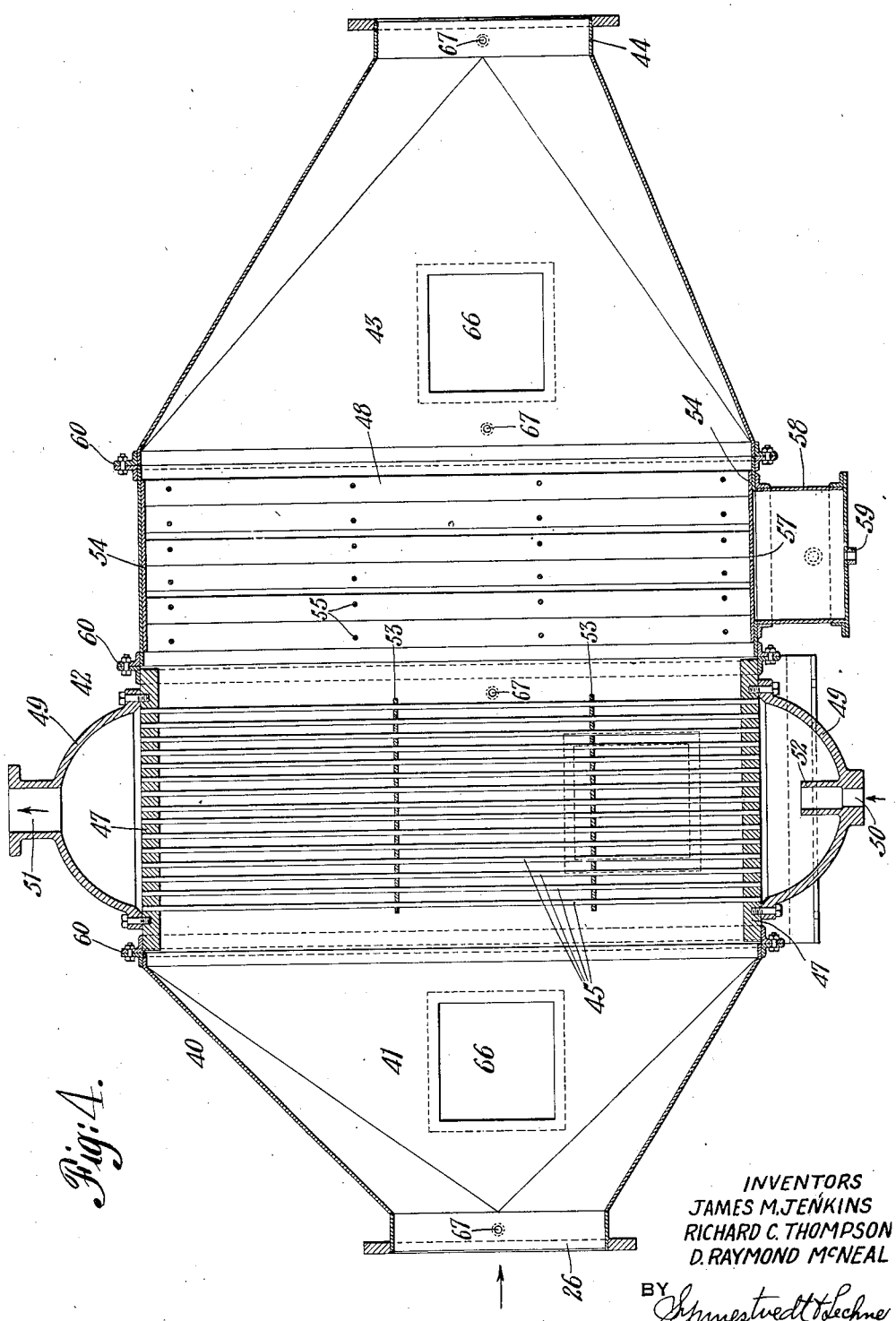

1,966,173

UNITED STATES PATENT OFFICE 1,966,173

TREATMENT OF GAS AND APPARATUS THEREFOR

James M. Jenkins, Philadelphia, Pa., Richard C. Thompson, Woodmont, Conn., and Daniel Raymond McNeal, Abington, Pa., assignors to Andale Company, Philadelphia, Pa., a corporation of Pennsylvania Application May 8, 1931, Serial No. 536,000

11 Claims. (Cl. 62—179)

Our invention relates to the treatment of illuminating gas and the like, though in certain aspects it may be adapted and extended to other uses. We have hereinafter described and explained it as applied especially to artificial gas for lighting or fuel, such as water gas.

Water gas is made by passing steam over heated coke. The resultant hot mixture of carbon monoxide and hydrogen contains impurities of various kinds from the coke. This gas is subjected to a water-scrubbing operation, to remove some of its impurities and reduce its temperature somewhat, besides being enriched by addition of light oil. It undergoes other operations which further purify it, and reduce its temperature,— and which we have hereinafter referred to collectively as "secondary treatment". It may then pass into storage holders, whence it is fed into the delivery system of mains and pipes that convey and distribute it to consumers.

Besides the reduction in temperature in the water-scrubbing, and that incident to the secondary treatment, it has been customary to cool the gas by means of heat exchangers, employing water as cooling agent. Large quantities of water have been thus used, without, however, bringing the gas down to any very low temperature. The heat abstracted from the gas in this way has generally been wasted, or largely so.

As the gas enters the delivery system, it is substantially saturated with water and oily vapors at the temperature which it then has, owing to its origin and subsequent enrichment as above described, etc. When, therefore, the temperature of the gas at any point in the distributing system becomes lower than its entering temperature, then part, at least, of the water and other vapor condenses out and is deposited as a "dew," which accumulates at the low points in the system, whence it must be pumped out from time to time. In addition, any subsequently occurring rise in temperature at points of accumulation results in reevaporation of the dew; and the vapor is carried along with the gas and redeposited at other regions of low temperature in the system. Gummy deposits result, which in course of time flake off, so that the material is carried along by the gas.

Gummy deposits forming on gas-meter diaphragms make the meters run slow; while deposits or flakes forming or lodging in fine passages of gas appliances served by the system—such as refrigerators, gas ranges, water heaters—often cause stoppages, especially in the small pilot lights of such appliances. While seemingly trifling, such troubles are in the aggregate a source of great expense to large gas-distributors, and of considerable annoyance and irritation amongst their customers.

In accordance with our invention, we obviate these difficulties by excluding or eliminating from the gas, before it enters the delivery system, the components condensible therein at and above the lowest temperatures to be encountered in the delivery system at the season or time of the year when the gas is to be distributed. This we prefer to do by cooling and chilling the gas substantially to or below the lowest temperature in the system, thereby condensing and segregating the water and other vapors in excess of what would saturate the gas at that temperature. In this connection, it is to be remarked that the buried mains and pipes of the distribution system are not subject to great temporary extremes of atmospheric temperature; so that a final temperaure of about 30° F. as the gas enters the distribution system is generally low enough. This compares with about 185–190° F. when the gas from the producing plant leaves the water scrubbers, and about half of this, perhaps, when it enters the storage holders under former practice.

To be sure of always cooling and chilling the gas to a low enough temperature, we generally employ artificial refrigeration, at least for the final chilling. By preference, we divide the cooling and chilling into a plurality of stages, and may interpose between these stages some or all of the operations hereinbefore referred to as the "secondary treatment" of the gas. This not only gives favorable conditions for the secondary treatment, but also helps toward a peculiar correlation which we have devised between the cooling and chilling operation and the "absorption" process of refrigeration,—which is the one that we generally prefer to employ. By this correlation, the cost of chilling the gas is materially reduced, and other advantages are realized.

Our correlation involves, in a more elaborate form, (1) "cracking" the liquor or solution of refrigerant that is produced in the "absorption" process by the relatively high heat of the gas as it comes from the scrubbers, thereby partly cooling the gas, and (2) vaporizing the liquid refrigerant by the heat remaining in the gas after part or all of the secondary treatment, thereby further cooling and chilling the gas to the required ultimate low temperature. Thus, preferably, we avoid the expense of a special source of heat to crack the liquor (as usual in absorption refrigeration system) by utilizing the high heat of the gas, which would otherwise be a total loss. While the temperature of 185-190° F. for the gas is lower than the 215° F. or higher heretofore deemed needful for cracking in an absorption system, we have found this an advantage rather than a drawback, since it avoids the breaking down of the ammonia into non-condensible gases that has hitherto proved troublesome in absorption refrigeration, reduces the moisture carried over with the ammonia vapor from the cracking, and obviates violent ebullition of the strong liquor.

This application is a continuation in part of our pending application Serial No. 327,642, filed December 21, 1928, as to common subject-matter described and claimed.

In the drawings:—

Fig. 1 is a diagrammatic or schematic view of part of a gas plant, partly in side elevation, and partly in vertical section, illustrating the apparatus and operations which the gas passes through after manufacture, including a "generator" adapted for a preferred method of carrying out our present invention.

Fig. 2 is a similar view of another part of the plant, through which the gas passes after leaving the part shown in Fig. 1, including a "dehydrator" adapted for a preferred method of carrying out our invention.

Fig. 3 is a diagram or schematic view of a refrigerating system for cooling and chilling the gas, including the generator and dehydrator of Figs. 1 and 2.

Fig. 4 shows a vertical longitudinal section through a form of apparatus suitable for the generator and dehydrator of Figs. 1 and 3.

Fig. 5 shows a horizontal section through the apparatus shown in Fig. 4.

Fig. 6 is a fragmentary view similar to Fig. 5, showing certain parts on a larger scale.

At the extreme left of Fig. 1 is shown the wash box or water scrubber 10 above referred to, through which the gas passes on its way from the water gas set or plant (not shown), where it is produced and enriched, to the secondary treatment. In the scrubber 10, the gas is largely freed of its grosser impurities, and its temperature is considerably reduced. In one usual secondary treatment the gas passes (after leaving the wash box 10) through a condenser 11, where it is further cooled, and freed of part of the water and other vapors with which it is saturated; into and through a "relief holder" 12, which takes care of and equalizes sudden variations in the rate of production of the gas, equalizing its flow; through an "exhauster" 13, which raises its pressure somewhat; and through a purifier 14 and an oil scrubber 15, (the latter preferably containing grid packing) both of which further purify it. Finally, after all treatments are over, the gas passes through a meter 16 that measures the quantity flowing, and into a storage holder 17, where it is accumulated, and whence it is fed through a pressure governor 18 to the delivery or distributing system 19.

All of these parts and operations are well known in the art, and also various alternatives for them; so that detailed description here is unnecessary.

As shown in Figs. 1 and 2, the "generator" 20 of the refrigerating system is interposed in the path of the hot gas as it leaves the wash box 10, and a vaporizer or "dehydrator" 21 is interposed in the path of the partly cooled gases as they leave the oil scrubber 15. The generator 20 and the dehydrator 21 may be heat exchangers of any suitable construction—that which we prefer being shown in Figs. 4, 5 and 6, and described hereinafter.

In the generator 20, the heat of the gas is used (as mentioned above) to "crack" a combination of a refrigerant in a carrying vehicle; or, in other words, to evaporate the refrigerant from a solvent. For illustration, it is assumed that the refrigerant is ammonia in the present instance, and that the solvent is water. Re-solution of the ammonia gas or vapor in the water takes place in the absorber 23, as usual in absorption refrigerating systems.

The arrows on various parts and pipes in Fig. 3 indicate the flow of illuminating gas, refrigerant, "liquor" (as the solution of the refrigerant is termed), and cooling medium.

The pump 24 withdraws the concentrated solution from the absorber 23 through the reservoir 25, and delivers it into the bottom of the generator 20. In the generator 20, the heat of the illuminating gas coming in at 26 "cracks" the liquor or aqueous solution of ammonia, liberating the latter as gas or vapor. The mingled gas and liquid rise into the accumulator 27, where the bubbles of gas become disengaged.

From the accumulator 27, the ammonia gas passes through the rectifier 28, where as much as possible of the water which has been vaporized by the heat of the generator, is recondensed; this drains into the collector 29 and returns at 30 into the liquor inlet of the generator 20. The ammonia gas, substantially freed from water vapor ("rectified") passes from the collector 29 into the refrigerant condenser 31, where it is condensed, as usual in systems of this kind.

From the accumulator 27, the weakened liquor is discharged through a pressure-reducing valve 32 controlled by a float 33 at its high pressure side that maintains a substantially constant liquid level in the accumulator 27. From the valve 32, the weak liquor passes through a cooler 34, where it is cooled, and thence to the top of the absorber 23, where it comes in direct contact with ammonia gas and is thus reconcentrated,—to be again withdrawn by the pump 24, etc., and repeat the cycle.

Recurring to the condenser 31, the ammonia condensed to liquid therein drains down and collects in the receiver 35, whence it passes through a flash cooler 36 (to be again referred to hereinafter) to the expansion valve 37, controlled by a float 38 at its high-pressure side.

From the expansion valve 37, the ammonia passes through the dehydrator 21, expanding to gas or vapor as it absorbs heat from the illuminating gas entering at 26, and thus reducing the temperature of this gas from about 100° F. as it enters the dehydrator to the desired final low temperature of 30° F.,—or whatever may be required by the conditions in the delivery system 19 from time to time.

From the dehydrator 21, the ammonia vapor passes through the flash cooler (heat exchanger) 36, where it cools the liquid ammonia on its way to the expansion valve 37, so that the proportion of ammonia liquid which has to turn into gas to cool the remaining liquid to the temperature maintained in the dehydrator is reduced. In other words, this device serves to minimize the amount of "flash gas" which has many advantages well known to the art, and especially valuable in a machine of this type. From the flash cooler 36, the ammonia vapor passes into the top of the absorber 23, where it comes directly in contact with the weak liquor and is dissolved therein, thereby reconcentrating the liquor, as already mentioned.

The rectifier 28, condenser 31, absorber 23, and weak liquor cooler 34 may be heat exchangers of any suitable construction, cooled by water or other medium (which is not allowed to mingle with the vapor or liquor to be cooled), and at a temperature intermediate that of the illuminating gas as it enters the generator 20 and when it leaves the dehydrator 21. As shown, the cooling water passes through the absorber 23 and the condenser 31 in series. In the flash cooler 36, of course, the liquid ammonia on its way to the expansion valve is not allowed to mingle with the vapor coming from the dehydrator 21. The pump 24, it will be understood, maintains whatever pressure may be desired in the high-pressure sides of the system, from the pump to the valves 32 and 37.

The chilling of the gas in the dehydrator 21 lowers its saturation point and condenses a correspondnig part of the water and other vapors in the gas; so that no matter what temperature changes (up and down) the gas may subsequently undergo in the delivery system 19, no temperature that is not below that attained by the gas in the dehydrator can cause any condensation or deposit in the delivery system 19. In other words, the "dew point" of the gas is lowered to the temperature reached in the dehydrator 21. The condensate in the dehydrator 21 (as well as in the generator 20) may be collected and withdrawn as hereinafter described.

Figs. 4, 5 and 6 show a heat exchanger suitable for generator 20 or dehydrator 21. It comprises a casing 40 expanding at 41 from the illuminating gas intake 26 toward the rectangular midportion 42, and contracting again at 43 toward the outlet 44. Upright cooling tubes 45 extend across the mid-portion 42 on the side toward the intake 26, between tube sheets 47, 47 forming part of the casing walls, and there are upright baffles 48 toward the outlet. Hemispherical heads 49, 49 are secured to the tube sheets 47, 47 over the ends of the tubes 45, with inlet 50 and outlet 51 for the fluid (strong liquor or expanded refrigerant) that is to absorb the heat from the illuminating gas. As shown, there is an inward extending flange or sleeve 52 around the inlet 50. Across the bank of tubes 45 extend horizontal baffles 53 for directing the flow of illuminating gas.

As shown in Figs. 5 and 6, the upright baffles 48 are of obtuse-angled section, and arranged in transverse rows, with their ends fastened to plates 54, 54 detachably secured to the casing. The baffles 48 of each row are arranged with their successively acting surfaces (wings) extending in the general direction of gas flow, but oppositely inclined relative thereto, so as to cause the entrained liquid condensed in the gas by the tubes 45 to impinge and collect on the baffles, and run down them, and so that their angles are bisected by a common transverse plane through their apices. They are interconnected and braced together by transverse rods 55, 55 extending in pairs through the flanges of each angle 48, at suitable intervals in their length. In adjacent rows, the angles 48 are staggered, so that the leading edge of each lies opposite the middle of the space between the adjacent edges of baffles in the preceding row. The rear right-hand edges of the last baffles 48 are curled inward at 56, to form lips for retaining drops of liquid collecting on the baffles, and prevent these drops from being blown off by the gas. Some of the vapor condensed out of the gas by the tubes 45 may collect on the tubes and run down them to the bottom of the casing; the rest is caught on the baffles 48 and runs down them. From the bottom of the casing, the condensate runs through holes 57 in the lower plate 54 (in the angles of the baffles 45) into a subjacent sump or box 58, provided with one or more drain openings 59 through which the condensate can be drawn off.

As shown in Figs. 4 and 5, the casing 40 is made in a plurality of sections with mating angle bar flanges 60 at their adjacent edges, by which the sections are detachably bolted together. In the present instance, there are four such sections, two consisting of the divergent and convergent inlet and outlet portions 41, 43, and two coacting to form the mid-portion 42—one a condensing section including the tubes 45 and tube-sheets 47, 47, and the other a baffle and collecting section with the baffles 48 and their plates 54, 54, etc. All of the sections except that with the baffles 48 have lateral clean-out openings with cover plates 66. All of the other sections also have lateral test-holes 67, with external lips or nipples.

We claim:—

1. A cooling and chilling treatment of artificial gas by an absorption refrigeration process, characterized in that the concentrated refrigerant liquor is cracked by the heat of the gas as it comes from the producing plant, and the gas thereby cooled, before the secondary treatment of the gas; and that after such secondary treatment, the liquid refrigerant is vaporized by further heat from the gas, and the gas thereby further cooled and chilled.

2. A chilling treatment of artificial gas, to prevent objectionable condensation and deposit therefrom in a delivery system, by an absorption refrigerating process; characterized in that the refrigerating liquor is cracked by the heat of the gas at its moderately high temperature as it comes from the producing plant, and the gas thereby partly cooled; and that the liquid refrigerant is vaporized by further heat from the gas, and the latter thereby further cooled and chilled to the lowest temperature to be encountered in the delivery system; while the cooling of weak liquor and of refrigerant is effected at an intermediate temperature.

3. The combination with a plant for the production and secondary treatment of gas, of an absorption refrigeration system for cooling and chilling the gas, including a generator traversed by the gas in advance of the secondary treatment wherein the concentrated refrigerant liquor is cracked by the heat of the gas, and the latter thereby cooled, and a vaporizer or dehydrator traversed by the gas after the secondary treatment, wherein the liquid refrigerant is vaporized by the heat of the gas and the latter further cooled and chilled, and objectionable water, oily, and gummy matter thereby condensed out and eliminated from the gas.

4. In the manufacture and distribution of artificial gas, that method of dehydrating the gas before distribution which comprises cooling the gas by the absorption refrigeration process and separating the refrigerant from the solvent by utilizing heat from the gas as it leaves the plant.

5. In the manufacture and distribution of artificial gas, that method of dehydrating the gas before distribution which comprises cooling the gas by the absorption refrigeration process and operating the generator by heat from the gas to be dehydrated.

6. In the manufacture and distribution of artificial gas, the method of dehydration which comprises cracking a refrigerant carrying vehicle by heat from the gas and cooling the gas by the refrigerant so released.

7. An apparatus for dehydrating gas comprising in combination, a refrigerant generator heated by the gas to be dehydrated, a refrigerant condenser, a gas dehydrator cooled by expanding the condensed refrigerant, a refrigerant absorber, means for returning vaporized refrigerant to said absorber, and a pump for delivering the refrigerant solution under pressure to said generator.

8. Apparatus for dehydrating fluids comprising, in combination, a generator for utilizing heat from the fluid to separate a refrigerant from its solvent, a condenser, an absorber, a refrigerating unit, means for delivering the refrigerant from the condenser to said unit for expansion, means for passing the fluid through the refrigerating unit, means for returning refrigerant vapor to the absorber, means for returning weak liquor from the generator to the absorber, and a pump for circulating the liquor under pressure.

9. Apparatus for dehydrating fluids comprising, in combination, a generator for utilizing heat from the fluid to separate a refrigerant from its solvent, a condenser, an absorber, a refrigerating unit, means for delivering the refrigerant from the condenser to said unit for expansion, means for passing the fluid through the refrigerating unit, means for returning refrigerant vapor to the absorber, means for returning weak liquor from the generator to the absorber, a cooler for cooling the weak liquor, and a pump for circulating the liquor under pressure.

10. The method of dehydrating artificial gas before delivering it to the mains which includes passing the hot gas as it comes from the plant through a refrigerant generator to separate the refrigerant from its solvent, condensing the vaporized refrigerant and then expanding it in a cooling unit, and passing the gas coming from the generator through said cooling unit.

11. In apparatus for distributing artificial gas, the combination of a refrigerant generator, means for delivering hot gas as it comes from the manufacturing plant to said generator to evaporate the refrigerant, a refrigerant condenser for receiving the vapor from the generator, a gas dehydrator, means for delivering to and expanding the condensed refrigerant in said dehydrator, means for passing the gas coming from the generator through said dehydrator to be cooled by the expanding refrigerant, a refrigerant absorber, means for returning vaporized refrigerant to said absorber and a pump for delivering the refrigerant solution under pressure to said generator.

JAMES M. JENKINS.
RICHARD C. THOMPSON.
DANIEL RAYMOND McNEAL.